United States Patent
Jiang

(10) Patent No.: US 7,254,143 B2
(45) Date of Patent: Aug. 7, 2007

(54) LOCAL SUSPEND SCHEME FOR WIRELESS COMMUNICATION SYSTEMS

(75) Inventor: Sam Shiaw-Shiang Jiang, Hsingchu (TW)

(73) Assignee: Innovative Sonic Limited, Tortola (VG)

( * ) Notice: Subject to any disclaimer, the term of this patent is extended or adjusted under 35 U.S.C. 154(b) by 1030 days.

(21) Appl. No.: 10/286,588

(22) Filed: Nov. 1, 2002

(65) Prior Publication Data

US 2004/0085932 A1  May 6, 2004

Related U.S. Application Data

(60) Provisional application No. 60/333,822, filed on Nov. 19, 2001.

(51) Int. Cl.
*H04J 3/22* (2006.01)
*G06F 11/00* (2006.01)

(52) U.S. Cl. ..................... 370/469; 370/235
(58) Field of Classification Search ............. 370/469, 370/252, 459, 235
See application file for complete search history.

(56) References Cited

U.S. PATENT DOCUMENTS

2004/0009786 A1* 1/2004 Terry .................. 455/522

OTHER PUBLICATIONS

3rd Generation Partnership Project, Technical specification Group Radio Access Betwork, RLC protocal Specification (relase 1999), Sep. 2001.

* cited by examiner

*Primary Examiner*—Barry Taylor
(74) *Attorney, Agent, or Firm*—Birch, Stewart, Kolasch & Birch, LLP

(57) ABSTRACT

This invention provides solutions to resolve the potential security unsynchronizing problem when upper layers issue a suspend command to the RLC entity while a TFC selection exchange process has been initialised. Three solutions of this invention, can be used either in UM or in AM environment, in which the RLC entity defines a safe range factor and add it to the upper-layers-passed parameter N of the prior art to calculate a new suspend sequence number for the suspended RLC entity. During the suspension, the RLC entity will continuously pass the scheduled RLC PDUs to lower layers as long as the SN of scheduled RLC PDU is less than the new suspend sequence number. One solution of this invention is more suitable to be implemented in UM than in AM. In this solution, upper layers decide and pass to the RLC entity a suitable parameter N having a more tolerant safety range than the prior art does.

14 Claims, 4 Drawing Sheets

US 7,254,143 B2

LOCAL SUSPEND SCHEME FOR WIRELESS COMMUNICATION SYSTEMS

CROSS REFERENCE APPLICATION

This application claims priority from U.S. Provisional Patent Application No. 60/333,822 filed on Nov. 19, 2001.

BACKGROUND

According to the architecture of the Universal Mobile Telecommunications System (UMTS), the UE-UTRAN radio interface has three protocol layers: the physical layer (L1); the data link layer (L2); and the network layer (L3). Layer 2 is further split into following sublayers: Medium Access Control (MAC), Radio Link Control (RLC), Packet Data Convergence Protocol (PDCP) and Broadcast/Multicast Control (BMC). In turn the RLC sublayer has three different types RLC entities: Transparent Mode (TM), Unacknowledged Mode (UM), and Acknowledged Mode (AM). In FIG. 1, the diagram shows a simplified model of UM RLC peer entities.

RLC performs several basic functions for its upper layers, namely, 1. RLC segments variable-length upper layer Service Data Units (SDUs) into smaller RLC Protocol Data Units (PDUs)s; 2. RLC performs data packages concatenation. If the last segment of an RLC SDU does not fully occupy one RLC PDU, the first segment of the next RLC SDU may be put into the RLC PDU in concatenation with the last segment of the previous RLC SDU; 3. RLC reassembles Protocol Data Units (PDUs) into RLC SDUs; 4. RLC transfers user data that conveys data between users of RLC services; and 5. RLC discards SDUs that allows a RLC transmitter to discharge RLC SDU from the buffer to prevent buffer overflow.

Of course depending on the type of RLC entities, RLC provides additional functions to its upper layers, such as, padding for data package, error correction, in-sequence delivery of upper layers PDUs, duplicate detection, flow control, sequence number check, protocol error detection and recovery and ciphering.

Once RLC PDUs are ready to be passed to the MAC sublayer and scheduled for transmission, package parameters, such as the data size of scheduled PDUs and the number of PDUs that can be transferred in each transmission time interval (TTI), are submitted to MAC by the parameter "RLC Entity Info" of the primitive MAC-STATUS-Req. MAC uses a MAC-STATUS-Ind primitive to indicate to RLC for each logical channel the rate at which it may transfer data to MAC. As shown in FIG. 2, RLC PDUs are further transformed into MAC PDU with MAC selecting a Transport Format Combination (TFC) based on this and other parameters before passing these MAC PDUs down to lower layer L1. This process is called the "TFC selection exchange." Through this TFC selection process, RLC indicates to MAC the configuration parameters that are critical to TFC selection depending on its mode and the amount of data that could be transmitted at the next TTI. This primitive insures that MAC can perform TFC selection. It is possible that MAC would use this primitive to indicate that it expects the current buffer occupancy of the addressed logical channel in order to provide for optimized TFC selection on transport channels with long transmission time interval. At the UE, MAC-STATUS-Ind primitive is also used to indicate from MAC to RLC that MAC has requested data transmission by L1.

Meantime, a wireless system, especially a timer-based system, uses various timers to monitor the progress of many functions. For example, when upper layers pass a SDU to RLC, the timer Timer_Discard is started to monitor if the SDU has been processed within the countdown of the timer. When Timer_Discard expired, this monitored SDU should be discarded by the RLC. Upper layers set and signal the value of the timer.

Therefore, either in UM or TM, if a timer expires before the corresponding SDU is submitted to lower layer, "SDU discard without explicit signalling" shall be initiated. In AM, if a timer expires before the corresponding SDU is acknowledged, "SDU discard with explicit signalling" shall be initiated. According to the prior art, when the TFC selection exchange has been initiated while the timer Timer_Discard of a SDU expires, an AM RLC of a User Equipment (UE) may wait until after it provides MAC with the requested set of PDUs before discarding the aforementioned SDUs.

Moreover, the operations of RLC entity can be explained by using state models. In FIG. 3, it is a state model for a UM RLC protocol. A UM RLC entity will be in one of three states (Null state, Data_transfor Ready state and Local suspend state). In FIG. 4, it shows a state model for AM RLC entities, which has five states (Null state, Data_transfor Ready state, Local suspend state, Reset_Pending state and Reset_and_suspend state). AM and UM use the state variables to represent various statuses of each state in a protocol. All state variables are non-negative integers. Several state variables contain the Sequence Number (SN) of a PDU. UMD and AMD PDUs are numbered by modulo integer SNs cycling through the field: 0 to $2^{12}-1$ for AM and 0 to $2^7-1$ for UM. For example, the send state variable VT(S) contains the SN of the next AMD PDU to be transmitted for the first time. It shall be updated after the aforementioned PDU is transmitted. Meanwhile, the UM data state variable VT(US) contains the SN of the next UMD PDU to be transmitted. It shall be incremented by 1 each time a UMD PDU is transmitted. The invention will use the changes of state variables VT(S) and VT(US) to explain the detail implementation of this invention.

However, in the wireless system, many other unexpected interrupts could happen independently while the TFC selection exchange process has been initialized. Nevertheless, how a wireless system should react to these unexpected interrupts while TFC selection exchange process has been initialized is not well defined in the prior art. These unexpected interrupts are the reset procedure, the re-establishment function, the stop function, and the local suspend function.

In this invention, we shall focus on the local suspend function only. Based on the prior art, either in AM or in UM, the upper layer may issue a suspend command with parameter N to put the RLC entity into a local suspend state. In unacknowledged mode, when an UM RLC entity receives the suspend command, the RLC entity shall respond to the suspend request by sending the upper layers with a confirmation containing the current value of VT(US) and the RLC entity will not send UMD PDUs with sequence number $SN \geq VT(US)+N$. VT(US) contains the SN of the next UMD PDU to be transmitted. When the UM RLC entity is resumed by upper layers, the RLC entity shall resume data transfer procedure normally.

A similar mechanism is used in an RLC entity operating in AM. The upper layers may issue a suspend command with parameter N to the AM RLC entity. The AM RLC entity shall respond to the suspend request with a confirmation containing the current value of VT(S) back to the upper layers and the RLC entity will not send AMD PDUs with sequence number SN≧VT(S)+N. VT(S) contains the SN of the next new AMD PDU to be transmitted. When the AM RLC entity is resumed by upper layers, the RLC entity shall, if the RLC entity is suspended and a RLC Reset procedure is not ongoing, resume data transfer procedure normally. Otherwise, if the RLC entity is suspended and a RLC Reset procedure is ongoing, the RLC entity shall remove the suspend constraint and resume the RLC reset procedure.

Nevertheless, when upper layers issue a suspend command during the initiation of the TFC selection exchange, it can cause TFC selection and transmission scheduling of lower layers to fail. In general, for large enough value of N, this will not be a problem. However, for small value of N, this may cause problems. Since local suspend function may relate to ciphering configuration change, this situation need to be considered carefully. PDUs of sequence number after the suspending point or the suspend sequence number (VT(S)+N for AM and VT(US)+N for UM) may use a different ciphering configuration when transmitted after the entity is resumed by upper layers. The timing for resuming depends on the transmission status of Radio Resource Control (RRC) messages "Security Mode Command" or "Security Mode Complete". Any PDUs with SN greater than the suspending point before upper layers resume the RLC entity will suffer from security deciphering error. Therefore, this function cannot be simply delayed until after it provides MAC with the requested set of PDUs.

SUMMARY

This invention provides solutions for the unexpected interrupting situation, caused by upper layers invoking a local Suspend function upon the RLC entity, while a TFC selection exchange process has been initialized. This invention will add a safety range factor to the upper layer passed parameter N to calculate a new suspend sequence number. Three solutions of this invention can be implemented either in UM or AM. Each solution differs from others by how the safety range factor is calculated. Upon suspension, the RLC entity will continuously pass the scheduled RLC PDUs to lower layer as long as the SN of the scheduled RLC PDUs is less than the new suspend sequence number. Another solution proposed in this invention is suitable to be used in UM but not in AM. Instead of providing a safety factor by the RLC entity and adding it to the upper layers passed parameter N, upper layers will calculate the new parameter N with a more tolerant range built-in so that the new upper layers passed parameter has the effect of the old parameter plus a safety range factor.

Further scope of the applicability or the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
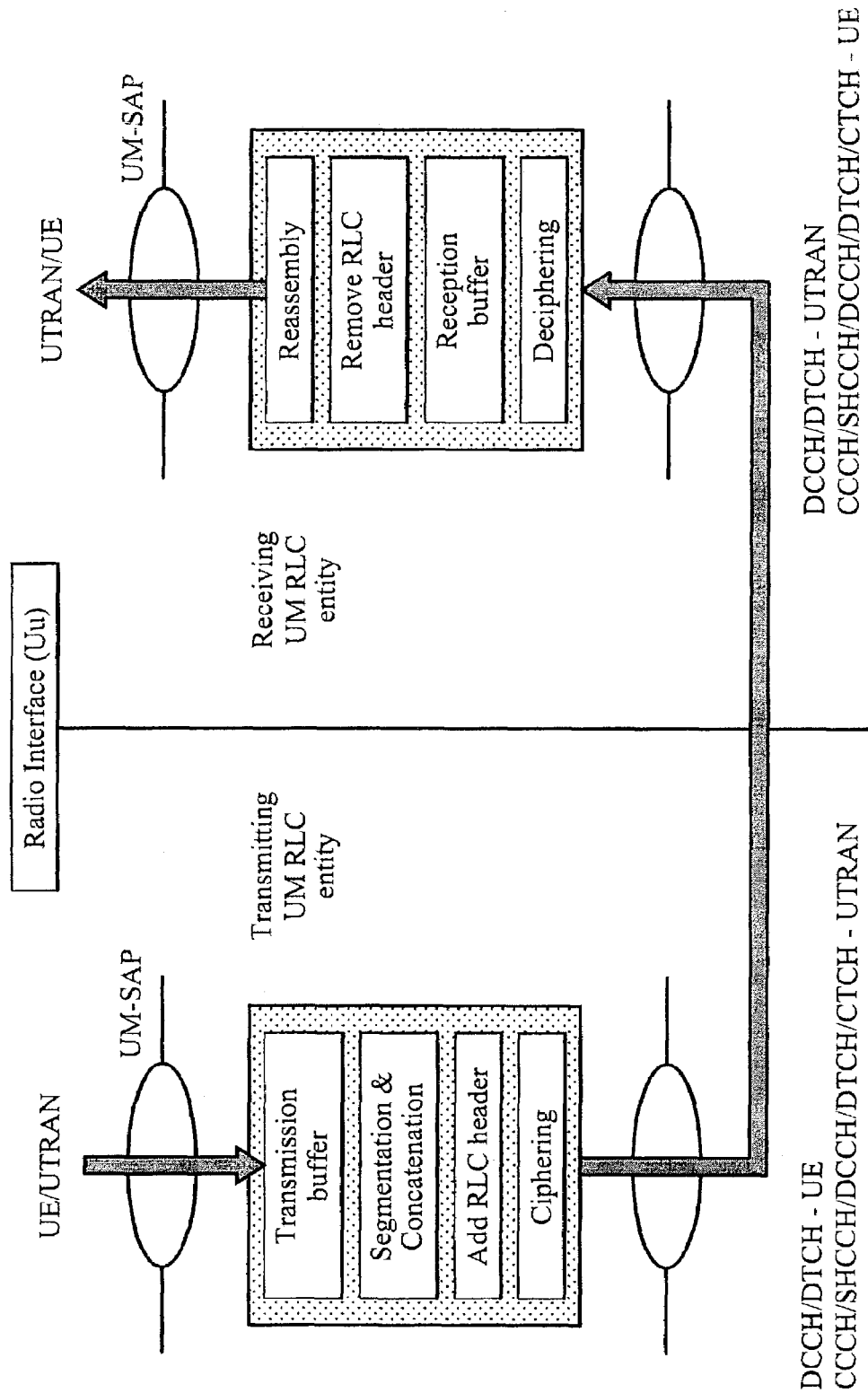
FIG. 1 illustrates a model of two UM peer RLC entities.
Figure 2:
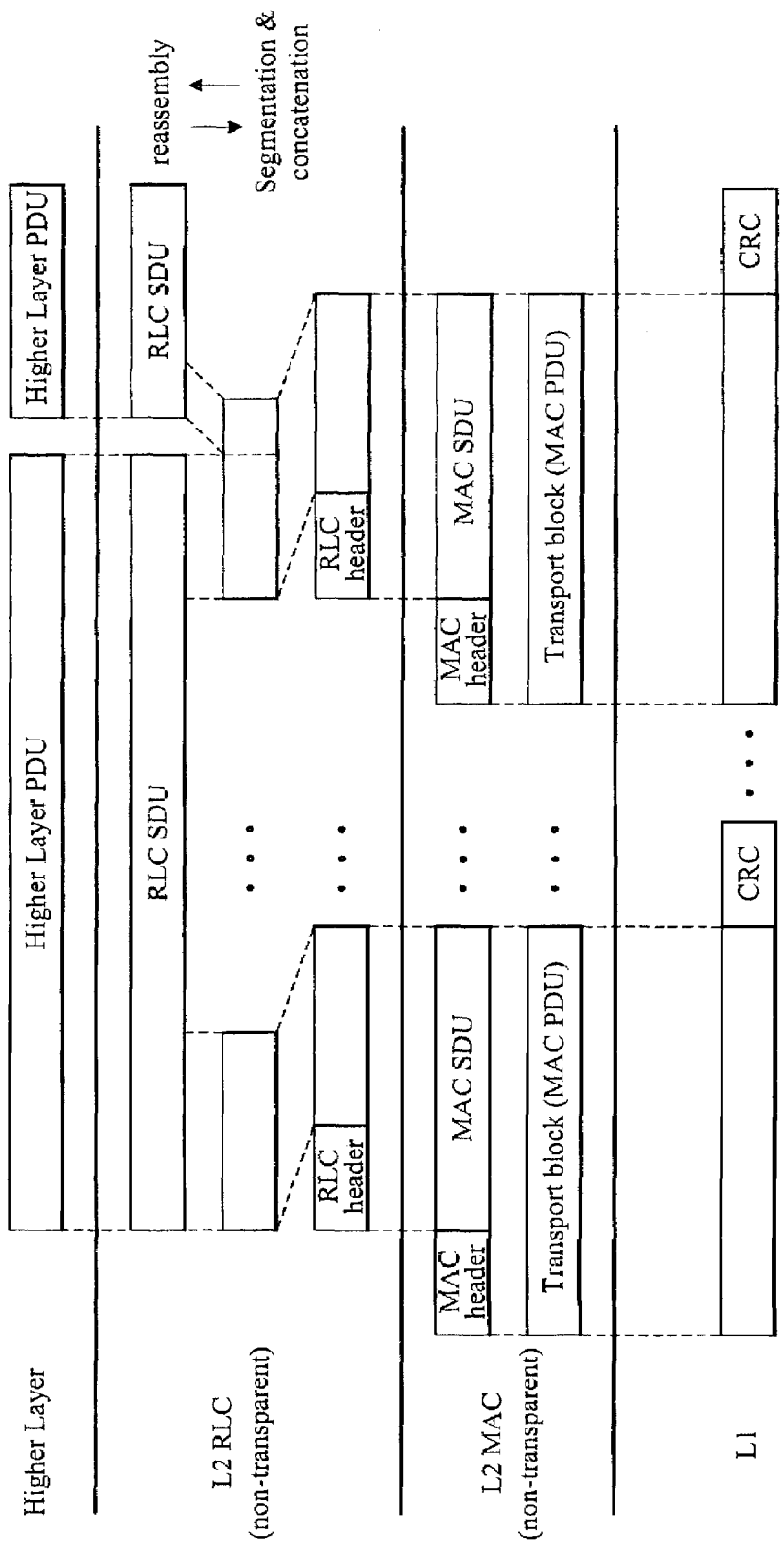
FIGS. 2 illustrates the data flow for non-transparent RLC and MAC.
Figure 3:
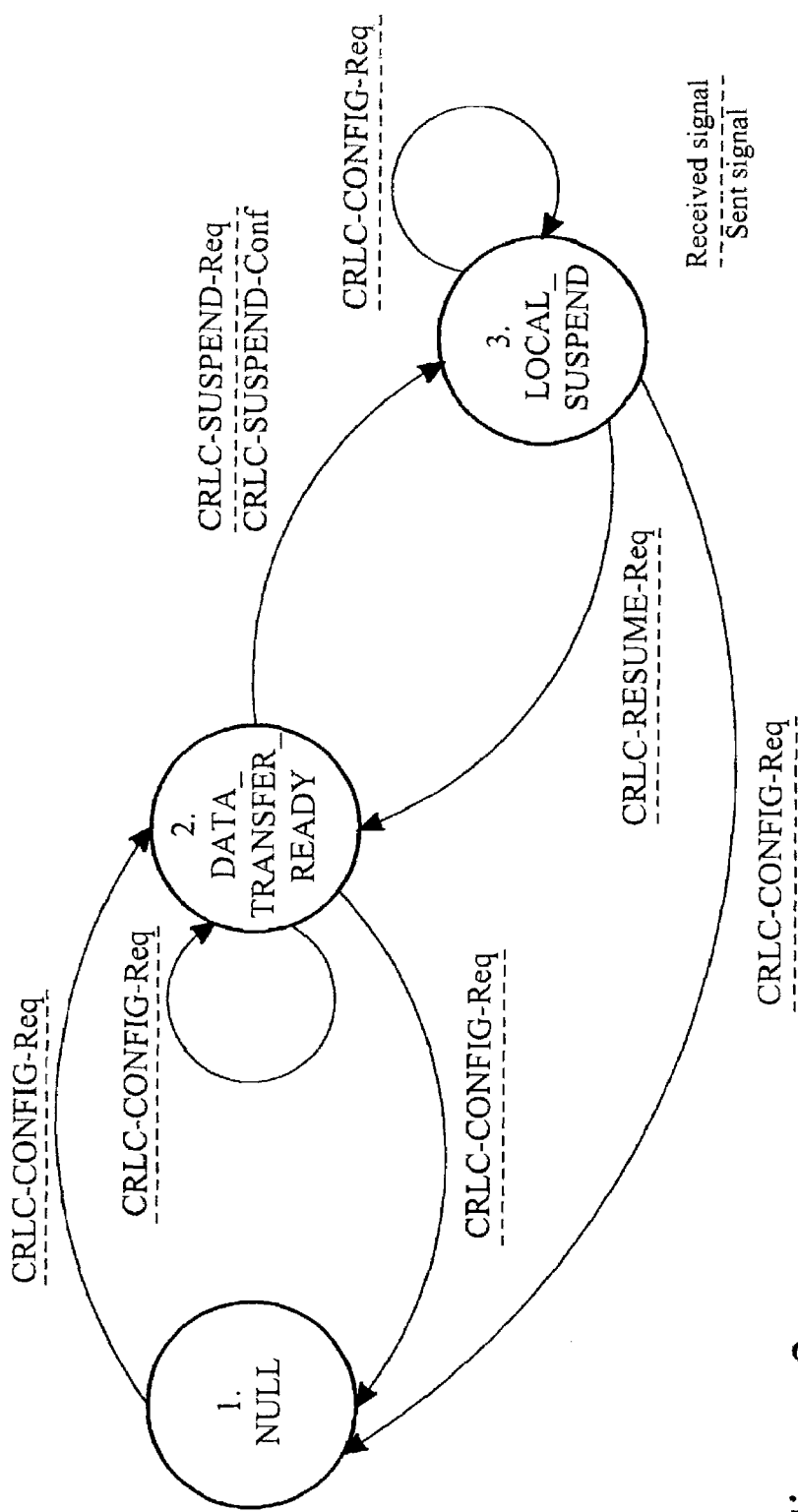
FIG. 3 illustrates the state model for UM RLC entities.
Figure 4:
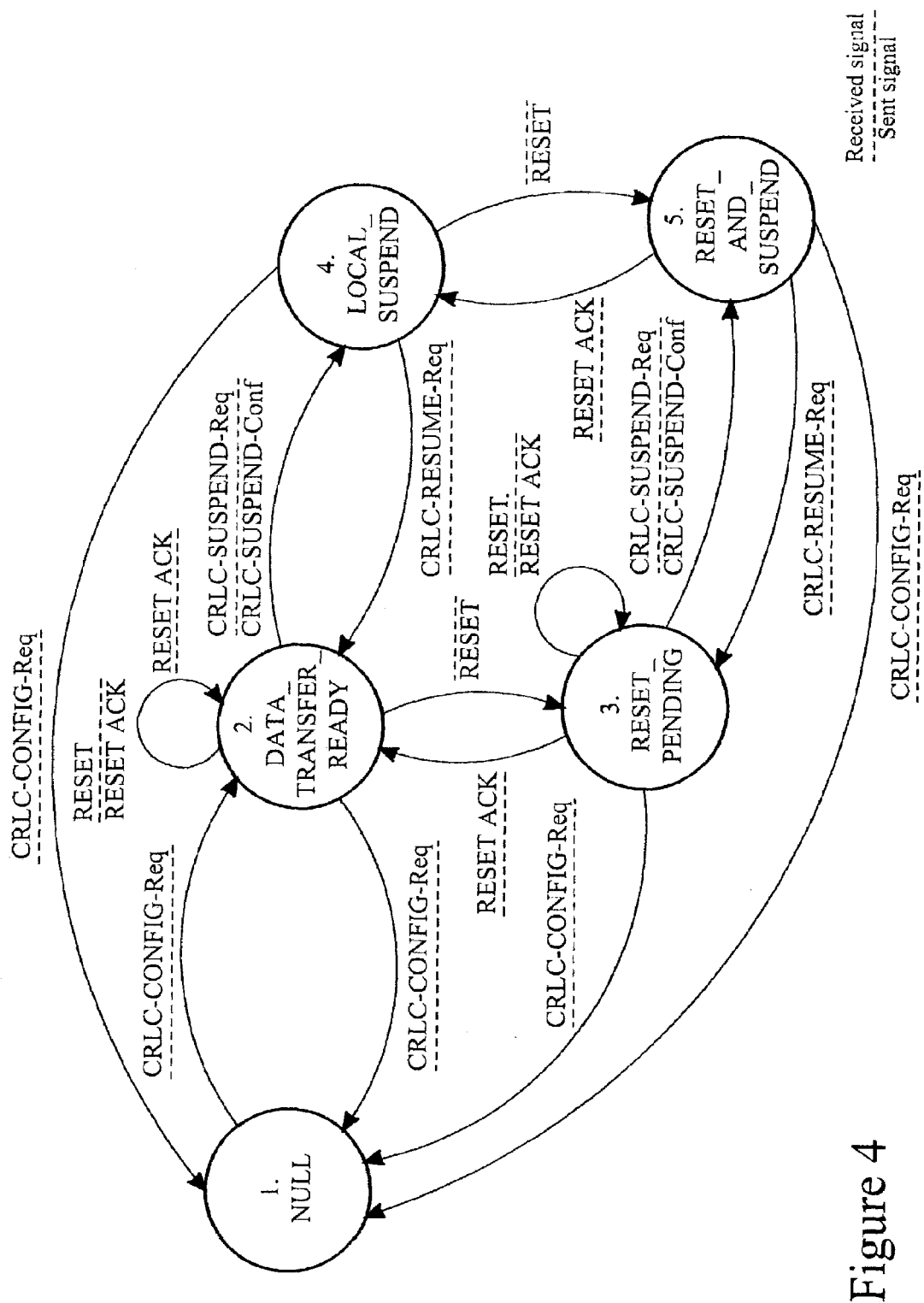
FIG. 4 illustrates the state model for AM RLC entities.

For a suspend command, this invention provides at least four possible solutions to deal with the potential problem. Among them, one solution (Solution (D)) can be applied for UM RLC only and the other three solutions can be applied for both AM and UM RLC.

In either UM or AM, as long as an RLC entity can make sure that the scheduled RLC PDUs on and after the suspending point will not be forced to be sent in the same Transmission Timing Interval (TTI) with these scheduled RLC PDUs before the suspending point by MAC when the TFC selection exchange was initiated, the possibility of ciphering synchronization problem can be avoided. This can be done at least in one of the following solutions: (set m=the maximum number of transport blocks for the RLC entity within the transport format combination (TFC) and s=the current value of VT(US) for UM or VT(S) for AM in the following solutions)

(A) When upper layers issue a suspend command to the RLC entity with the parameter N, the RLC entity shall respond to upper layers with a value x either equalling to the highest value of SN of the PDU that has been counted in the RLC Entity Info plus one, or equalling to s, whichever is higher. The new suspending point is SN=(x+N).

(B) When upper layers issue a suspend command to the RLC entity with the parameter N, the RLC entity shall respond to upper layers with a value x>=(s+m) so that it will work even for N=0 in the worst case. The new suspending point is SN=(x+N).

(C) When upper layers issue a suspend command to the RLC entity with the parameter N, the RLC entity shall respond to upper layers with a value x either (s+m−N) or s, whichever is higher. The new suspending point is SN=(x+N).

(D) When upper layers issue a suspend command to the RLC entity with the parameter N, upper layers choose a suitable value of N for each radio bearer. The minimum value of N is m. Solution (D) involves the upper layers and is not robust in AM for cases when ciphering reconfiguration procedure and RLC reset procedure happen concurrently, in which it might be necessary to set N to 0 so that the new ciphering configuration may be applied immediately after resume and termination of RLC reset procedure. Therefore, Solution (D) is applicable for UM RLC only.

Although in this application and various literature in this field use a multi-layer wireless system model to illustrate inter and intra operations within the system, however, in actual implementations either by software or hardware, these artificial divided layers and sublayers may be merged into fewer layers or even one layer. Hence the procedures and the processes discussed in a multi-layer environment should be evaluated accordingly. Nevertheless, the principle and methods of this invention work in a multi-layer, fewer layers or no layer environment.

The invention being thus described, it will be obvious that the same may be varied in many ways. Such variations are not to be regarded as a departure from the spirit and scope of the invention, and all such modifications as would be

What is claimed is:

1. A method to improve system stability in a wireless communication system, wherein data packaged in Packet Data Units (PDUs) and a Sequence Number (SN) assigned to each data packages for monitoring purpose, upon receiving a certain type of unexpected interrupt with a parameter N, transmitting PDUs of SN up to a suspend sequence number before halting the transmission of any PDUs of SN on or after the suspend sequence number, the method comprising the steps of:
   scheduling data to be transmitted by a Transport Format Combination (TFC) selection exchange process while the radio data transmission operation is in a particular mode;
   assigning the amount of scheduled data to be transmitted within the next transmission time interval (TTI);
   an unexpected interrupt caused by a local suspend function happening; and
   determining a suspend sequence number where the suspend sequence number is based on the parameter N, a calculated safety range factor and the sequence number of the next new PDU to be transmitted.

2. The method as claimed in claim 1, wherein the radio data transmission operation is in an Acknowledge mode.

3. The method as claimed in claim 1, wherein the radio data transmission operation is in an Unacknowledge mode.

4. The method as claimed in claim 3, further comprising:
   setting N>=the maximum number of transport blocks for the transmission entity within TFC; and
   setting the suspending sequence number to be (N+the SN of the next new PDU).

5. The method as claimed in claim 1, wherein determining a suspend sequence number further comprises the steps of:
   setting a delay factor x to the highest SN of the PDUs that have been scheduled for transmission plus one, or the SN of the next new PDU to be transmitted, whichever is higher; and
   setting the suspending sequence number to be (x+N).

6. The method as claimed in claim 1, wherein determining a suspend sequence number further comprises the steps of:
   setting a delay factor x>=the maximum number of transport blocks for the transmission entity within transport format combination (TFC)+the SN of the next new PDU to be transmitted; and
   setting the suspending sequence number to be (x+N).

7. The method as claimed in claim 1, wherein determining a suspend sequence number further comprises the steps of:
   setting a delay factor x to (the SN of the next new PDU to be transmitted+the maximum number of transport blocks for the transmission entity within TFC−N), or the SN of the next new PDU, whichever is higher; and
   setting the suspending sequence number to be (x+N).

8. A system having means for improving system stability in a wireless communication system, wherein data packaged in Packet Data Units (PDUs) and a Sequence Number (SN) assigned to each data packages for monitoring purpose, upon receiving a certain type of unexpected interrupt with a parameter N, transmitting PDUs of SN up to a suspend sequence number before halting the transmission of any PDUs of SN on or after the suspend sequence number, the method comprising the steps of:
   means for scheduling data to be transmitted by a Transport Format Combination (TFC) selection exchange process while the radio data transmission operation is in a particular mode;
   means for assigning the amount of scheduled data to be transmitted within the next transmission time interval (TTI); means for generating an unexpected interrupt caused by a local suspend function; and
   means for determining a suspend sequence number where the suspend sequence number is based on the parameter N, a calculated safety range factor and the sequence number of the next new PDU to be transmitted.

9. The system as claimed in claim 8, wherein the radio data transmission operation is in an Acknowledge mode.

10. The system as claimed in claim 8, wherein the radio data transmission operation is in an Unacknowledge mode.

11. The system as claimed in claim 10, wherein means for determining a suspend sequence number further comprises:
    means for setting N>=the maximum number of transport blocks for the transmission entity within TFC; and
    means for setting the suspending sequence number to be (N+the SN of the next new PDU).

12. The system as claimed in claim 8, wherein means for determining a suspend sequence number further comprises:
    means for setting a delay factor x to the highest SN of the PDUs that have been scheduled for transmission plus one, or the SN of the next new PDU to be transmitted, whichever is higher; and
    means for setting the suspending sequence number to be (x+N).

13. The system as claimed in claim 8, wherein means for determining a suspend sequence number further comprises:
    means for setting a delay factor x>=the maximum number of transport blocks for the transmission entity within transport format combination (TFC)+the SN of the sequence number of the next new PDU to be transmitted; and
    means for setting the suspending sequence number to be (x+N).

14. The system as claimed in claim 8, wherein means for determining a suspend sequence number further comprises:
    means for setting a delay factor x to (the SN of the next new PDU to be transmitted+the maximum number of transport blocks for the transmission entity within TFC−N), or the SN of the next new PDU to be transmitted, whichever is higher; and
    means for setting the suspending sequence number to be (x+N).

* * * * *